(12) United States Patent
Hogan et al.

(10) Patent No.: US 11,226,125 B2
(45) Date of Patent: Jan. 18, 2022

(54) COLD STORAGE ENERGY OPTIMIZATION SYSTEMS

(71) Applicant: Lettuce Box, Inc., Carlsbad, CA (US)

(72) Inventors: Mark Hogan, Encinitas, CA (US); Darryl Kuhn, San Diego, CA (US)

(73) Assignee: Lettuce Box, Inc., San Diego, CA (US)

( * ) Notice: Subject to any disclaimer, the term of this patent is extended or adjusted under 35 U.S.C. 154(b) by 100 days.

(21) Appl. No.: 16/823,917

(22) Filed: Mar. 19, 2020

(65) Prior Publication Data

US 2021/0222902 A1 Jul. 22, 2021

Related U.S. Application Data

(63) Continuation-in-part of application No. 16/744,703, filed on Jan. 16, 2020, now abandoned.

(51) Int. Cl.
*F24F 11/46* (2018.01)
*A23L 3/3418* (2006.01)
*G05B 13/04* (2006.01)

(52) U.S. Cl.
CPC ............ *F24F 11/46* (2018.01); *A23L 3/3418* (2013.01); *G05B 13/042* (2013.01); *A23V 2002/00* (2013.01)

(58) Field of Classification Search
CPC ...... F24F 11/46; A23L 3/3418; G05B 13/042; A23V 2002/00

USPC .......................................................... 700/278
See application file for complete search history.

(56) References Cited

U.S. PATENT DOCUMENTS

| 11,029,657 B2 * | 6/2021 | Al-Mohssen ............ G08G 1/00 |
| 2016/0136385 A1 * | 5/2016 | Scorcioni ............ A47C 21/044 600/26 |
| 2017/0300847 A1 * | 10/2017 | Jones ...................... F25D 13/00 |

FOREIGN PATENT DOCUMENTS

| CH | 708233 B1 * | 2/2018 | ............ G01K 1/022 |
| CN | 110793636 A * | 2/2020 | |

* cited by examiner

*Primary Examiner* — Ly D Pham
(74) *Attorney, Agent, or Firm* — Kevin Schraven; Anooj Patel; Hankin Patent Law, APC

(57) ABSTRACT

An energy optimization system for a load of perishable goods in temperature controlled storage, wherein a thermal profile of the load is developed, which is then used, in connection with temperature readings of the air and goods to simulate an expected temperature of the goods over an absolute or relative time duration at one or more set points. The simulation allows an optimal energy efficient set point to be determined, which may then be used to make the HVAC unit of the temperature controlled storage zone more energy efficient.

20 Claims, 5 Drawing Sheets

COLD STORAGE ENERGY OPTIMIZATION SYSTEMS

CROSS-REFERENCE TO RELATED APPLICATIONS

This Patent Application is a Continuation-in-Part Patent Application that claims the benefit of and priority to U.S. Non-Provisional patent application Ser. No. 16/744,703, filed on Jan. 16, 2020, titled "TEMPERATURE CONTROLLED STORAGE ENERGY OPTIMIZATION SYSTEMS", by inventors Mark Hogan and Darryl Kuhn, the contents of which are expressly incorporated herein by this reference as though set forth in their entirety and to which priority is claimed.

FIELD OF USE

Embodiments of the present disclosure generally relate to the field of optimizing energy usage for temperature controlled storage systems. More specifically, embodiments of the disclosure relate to devices, systems, and methods for the optimization of the energy used in the temperature controlled storage and transportation of loads of perishable goods.

BACKGROUND

Many perishable goods are impacted by temperature and, if not properly refrigerated, may be adversely impacted. Such negative impacts include spoilage, reduction of shelf-life, reduction in product quality, adjustment to cooking/preparation time, and damage from freezing, collectively this is called thermal abuse. For this reason, the cold-supply chain, generally, takes great care to maintain the temperature of the zone or area holding the thermally sensitive perishable goods within a well-defined temperature range during storage and transportation. It is also becoming increasingly important to conserve or reduce the energy required to refrigerate the thermally sensitive perishable goods during all aspects of the logistics operations of the cold-supply chain.

Currently, temperature controlled storage systems use thermistor sensors to measure the air temperature within a given storage zone and then operate a heating, ventilation, and air conditioning (HVAC) system to warm or cool the air within the zone to a desired "set-point" temperature. This, generally, allows the zone to stay within the desired temperature range with the singular goal of reducing and/or eliminating any negative thermal impacts. These systems generally accomplish their goal, in that they maintain a zone's air temperature within the specified range and reduce negative thermal impacts. However, this system has the drawback of the over-application of the HVAC system and a significant waste of energy used to cool the zone. This is because point-in-time air temperature readings, such as those that are collected by a thermistor sensor are not good indicators of actual product temperature. The air temperature may be out of the desired range, but the goods within the zone have a thermal mass and thermal inertia and may warm and cool at rates that are substantially different than the air surrounding it. This is particularly the case when a thermally sensitive perishable good only requires air conditioning for an absolute or relative time duration. An absolute time duration has a known end time, such as 2:00 pm. A relative time duration has a relative time, such as four hours from now. One example of an absolute or relative time duration might be when the goods are being housed in a distribution center, being transported, or nearing consumption by consumers. The current storage is only temporary, and, depending on what will happen next to the load of product, the current storage zone may be needlessly applying the default HVAC and energy expenditure in an unnecessary attempt to maintain product temperature when thermal mass and thermal inertia alone are enough to keep the perishable goods within the desired temperature range.

What is needed, therefore, is a system that can evaluate, and take into consideration, a load of goods' temperature, and thermal profile including properties, such as thermal mass, specific heat capacity, and inertia, diffusivity, and effusivity, in order to determine and set within the system a temperature set-point that optimizes (1) the product temperature and (2) an energy efficiency (for at least an absolute or relative time duration) of the HVAC system of the storage zone.

SUMMARY OF EMBODIMENTS

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

To minimize the limitations in the art, and to minimize other limitations that will become apparent upon reading and understanding the present specification, the present specification discloses a new and improved device, system, and method for optimizing the energy efficiency of a temperature controlled storage system, which comprises: (1) providing a temperature controlled storage space or zone; (2) providing a load of perishable goods; (3) developing a thermal profile for the load of perishable goods, which may be based on the specific configuration of the goods within the temperature controlled storage zone; (4) recording the temperature (one or more times during transportation or the entire temperature controlled storage logistics chain) of the perishable goods, which normally happens then the product is received, transferred, loaded, unloaded, and/or the like; (5) producing temperature controlled storage air temperature forecasts at various set-points by analyzing the periodic and past air temperature data in combination with one or more sets of meta data, including, but not limited to, thermal mass data associated with the temperature controlled storage structure in which the perishable goods reside, the route in which the structure is traveling or will travel in, the temperature controlled storage structure temperature history, the temperature of the ambient air surrounding the temperature controlled storage structure, and/or what happens next after the absolute or relative time durations (in the event that the load will go into a pre-cooled space (such as a freezer or refrigerator), the load may be allowed to rise to a temperature still within specification, but at the warmer end of the specification, or in the event that the load will unloaded and sit for a time before it may be put back into temperature controlled storage, the load may be cooled more so that the load is at the cooler end of the specification at the end of the time duration); (6) using the temperature controlled storage air temperature forecast data, the recorded temperature of the load of perishable goods, the thermal profile, and the periodic storage zone air temperature monitoring, to model, or simulate, over time, the expected temperature of the load of temperature controlled storage perishable goods and the current thermal inertia and other properties of the load of goods; (7) evaluating the simulated product temperature forecast against the remainder of a duration (absolute or relative) to determine whether the perishable goods in the temperature controlled storage zone will remain within a set temperature range (the spec or specification); and (8) altering the set-point if the simulation shows the perishable goods will remain in specification (this may be done automatically by controlling the HVAC unit of the temperature controlled storage zone or manually with an automatic prompt to a person). The forecasting may be repeated, with a new set point being selected until the simulation shows that the temperature of the goods will not remain within the specification. In one embodiment, the new set point may be warmer. In another embodiment, the set point may be cooler. When this happens, the last set point modeled that will allow the goods to remain within specification is then selected as the adjusted set point for the HVAC unit. In this manner the new set point optimizes the energy usage of the HVAC by only running the HVAC as much as is necessary to maintain the product temperature to be within spec.

The thermal profile may accurately model the thermal mass of the and/or the thermal inertia of the load to within a desired range of temperature, such as within 5° Celsius. In a preferred embodiment, the thermal profile may accurately model the thermal mass of the and/or the thermal inertia of the load of perishable goods to within 1° Celsius (C). The thermal profile may also comprise the minimum and maximum temperature at which the load of perishable goods must be maintained in order to prevent thermal abuse.

In the event that the absolute duration is extended, the system may remodel the expected product temperature and provide a revised set point that will keep the product within the specification.

The devices, systems, and methods of the present disclosure may allow energy efficiency by raising the set-point and allowing a load to warm to the warmer end of a specification. In other words, the HVAC system cooling the load may operate less and save energy. In addition, the present disclosure provides a system that optimizes the reduction of thermal abuse by allowing loads in a cold ambient environment to get colder when normally heating would be applied, such as when a load will remain within specification at the end of absolute time duration. The present disclosure also covers a system that optimizes the reduction of thermal abuse by allowing a load to get colder or warmer, but still within specification, if it is known that, at the end of the absolute time duration, the load will not immediately be within a stable link in the temperature controlled storage logistics chain.

One embodiment may be an energy optimization system for a load of perishable goods in cold storage, comprising: a cold storage zone within a cold storage structure, which receives a load of perishable goods; an air temperature sensor that takes continuous air temperature measurements within the cold storage zone; a product temperature sensor that takes at least one product temperature measurement; one or more networked computers, comprising one or more databases, a goods temperature modeling engine, and an air temperature modeling engine; wherein the cold storage structure comprises a heating ventilation and air condition (HVAC) unit that provides cooling to the cold storage zone; wherein the one or more networked computers receive the continuous air temperature measurements and the at least one product temperature measurement; wherein a thermal profile for the load of perishable goods is determined; wherein the air temperature modeling engine produces one or more cold storage air temperature forecasts at a first set point of the cold storage zone; wherein the goods temperature modeling engine produces one or more goods temperature forecasts of the load of perishable goods using (1) at least one of the one or more cold storage air temperature forecasts, (2) at least one of the at least one product temperature measurement, and (3) the thermal profile; and wherein the one or more goods temperature forecasts of the load of perishable goods is evaluated to determine whether the load of perishable goods will remain within a set temperature range. If the load of perishable goods does remain within the set temperature range, the first set point is replaced with a second set point and the air temperature modeling engine and the goods temperature modeling engine each produce a second forecast based on the second set point. If the load of perishable goods again remains within the set temperature range, the second set point is replaced with a third set point and the air temperature modeling engine and the goods temperature modeling engine each produce a third forecast based on the third set point. Eventually, the load of perishable goods does not remain within the set temperature range after any specific forecast that set point is unacceptable. In one embodiment, the set point modeled immediately before first unacceptable set point is an optimal set point in that the set point is more efficient, yet still keeps the load cool enough. In another embodiment, the optimal set point may keep the load warm enough, as in the case in which a freezing product or a product with a higher optimal temperature. The second set point may be a higher temperature than the first set point, such that if the second set point is used the HVAC unit is more energy efficient than if the first set point is used. The third set point may be a higher temperature than the second set point, such that if the third set point is used the HVAC unit is more energy efficient than if the second set point is used. Preferably, a plurality of set points may be modeled by the air temperature modeling engine and the goods temperature modeling engine until an optimal energy efficient set point is determined. After the optimal energy efficient set point is determined, the one or more networked computers may inform a user to enter the optimal energy efficient set point into a controller of the HVAC unit. Optionally, after the optimal energy efficient set point is determined, the one or more networked computers may automatically update a controller of the HVAC unit with the optimal energy efficient set point. The networked computers may further comprise a thermal profile engine, which develops the thermal profile. In some embodiments, the thermal profile may be developed based on one or more of the following: a thermal mass of the load of perishable goods; a thermal inertia of the load of perishable goods; a weight of the load of perishable goods; and/or a specific configuration of the load of perishable goods within the cold storage zone. The one or more cold storage air temperature forecasts may be determined by analyzing the continuous air temperature measurements, a plurality of past air temperature measurements, and/or one or more sets of meta data. The one or more sets of meta data may be selected from the group of meta data consisting of one or more of the following: a thermal mass data associated with the cold storage structure; route data associated with a transportation route of the load of perishable goods; a temperature history of the cold storage structure; estimated door open time during loading/unloading of the cold storage structure, and/or one or more temperature measurements of an ambient air that surrounds the cold storage structure. The thermal profile may comprise the set temperature range, which is a minimum temperature and a maximum temperature at which the load of perishable goods must be maintained in order to prevent thermal abuse of the perishable goods.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION

Figure 1:
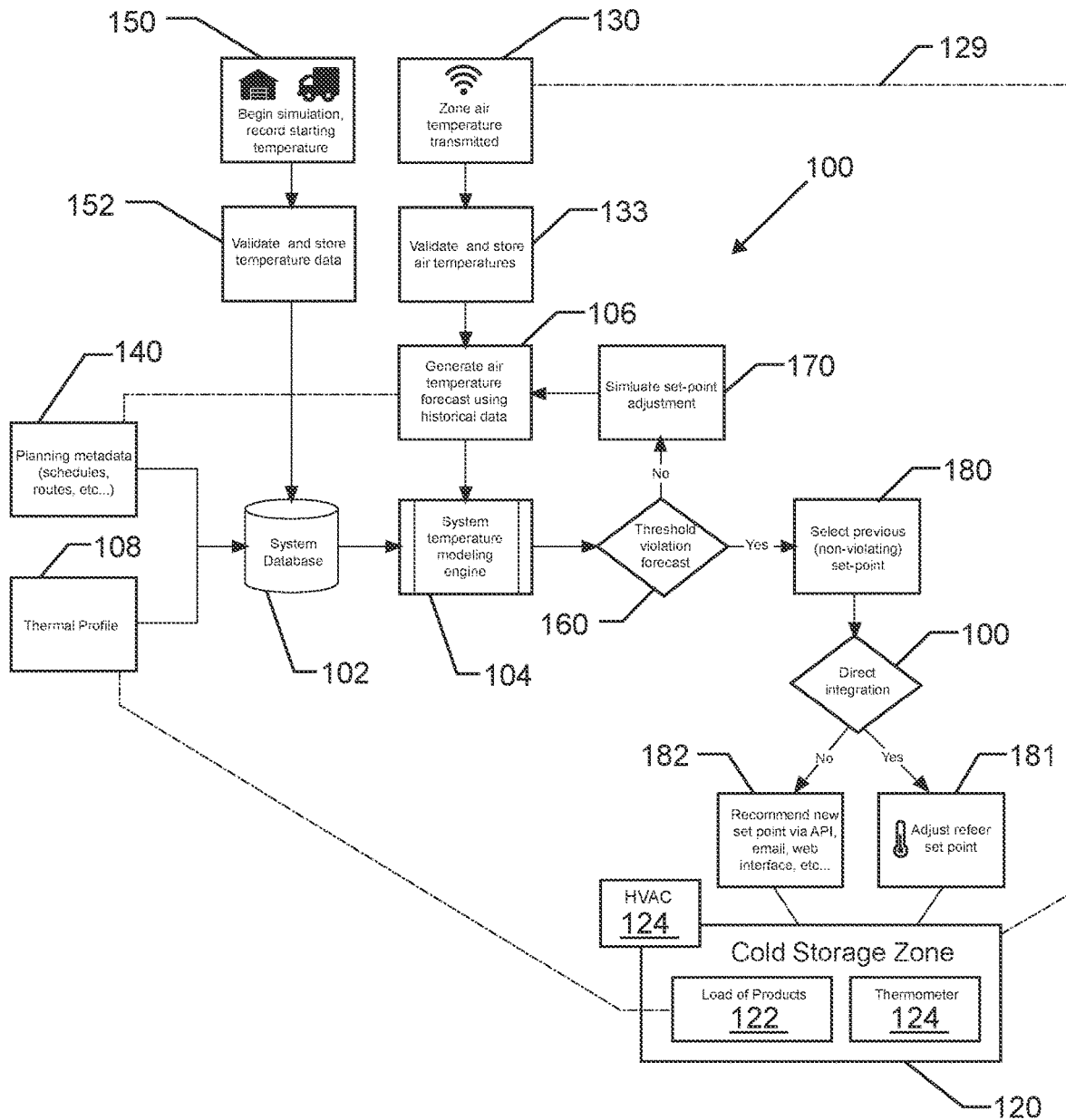
FIG. 1 is an illustration of a flow block diagram of one embodiment of a temperature controlled storage energy optimization system.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still other will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In the following description, certain terminology is used to describe certain features of the embodiments disclosed herein. For instance, the terms "computer", "computer system", "computing device", mobile computing device", "electronic data processing unit", or "server" refer to any device that processes information with an integrated circuit chip, including without limitation, personal computers, mainframe computers, workstations, servers, desktop computers, portable computers, laptop computers, embedded computers, wireless devices, including cellular phones, personal digital assistants, tablets, tablet computers, smart phones, portable game players, wearables, smart devices and hand-held computers.

As used herein, the term "Internet" refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof.

As used herein, the term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

The term "thermal abuse", as used herein, refers to any and all negative effects on a load of perishable goods that is caused by temperatures that are too high or too low. Thermal abuse includes, but is not limited to, spoilage, loss of color, loss of nutrients, shelf life being shortened, loss of attractiveness, melting, freezer burn, product degradation, and the like.

The term "thermal inertia", as used herein, refers to a bulk material property related to thermal conductivity and volumetric heat capacity. Generally, thermal inertia may be a measure of the thermal mass and the velocity of the thermal wave that controls the surface temperature of a material. In heat transfer, a higher value of the volumetric heat capacity means a longer time for the system to reach equilibrium. The thermal inertia of a material is defined as the square root of the product of the material's bulk thermal conductivity and volumetric heat capacity, where the latter is the product of density and specific heat capacity: $I=\sqrt{kpc}$. Where k is thermal conductivity, with unit [W m−1 K−1]; p is density, with unit [kg m−3], c is specific heat capacity, with unit [J kg−1 K−1]; and I have SI units of thermal inertia of [J m−2 K−1 s−½].

The term "goods thermal mass" or "thermal mass of the goods", as used herein, relates to the "heat capacity" or "thermal capacity" of the various types of loads of perishable goods that are being stored and/or transported. "Goods thermal mass", "thermal mass of the goods", "heat capacity", and/or "thermal capacity" is a physical property of matter that may be defined as the amount of heat to be supplied to a given mass of a material to produce a unit change in its temperature. The SI unit of heat capacity is joule per kelvin (J/K).

Heat capacity of an object or load, represented by C, is the limit:

$$C = \lim_{\Delta T \to 0} \frac{\Delta Q}{\Delta T},$$

wherein Delta Q is the amount of heat that must be added to the object (of mass M) in order to raise its temperature by Delta T.

The term "structure thermal mass", as used herein, relates to cold storage structures, which may enclose the cold storage zone, area, or space. Structure thermal mass is a property of the temperature controlled storage structure that enables it to store heat (or cold), providing the space with "inertia" against temperature fluctuations. Temperatures outside the temperature controlled storage structure, such as a refrigerated truck space will fluctuate throughout the day, but a large thermal mass within the insulated storage structure may serve to "flatten out" the daily temperature fluctuations. This is because the structure thermal mass will absorb thermal energy when the surroundings are higher in temperature than the mass and give thermal energy back when the surroundings are cooler, without reaching thermal equilibrium. Thermal mass is distinct from the structure's insulative value, which reduces a structure's thermal conductivity, allowing it to be heated or cooled relatively separate from the outside.

FIG. 1 is an illustration of a flow block diagram of one embodiment of a temperature controlled storage energy optimization system. While FIG. 1 illustrates a cold storage system, is understood that the temperature controlled storage energy optimization system may include any storage system that requires a controlled temperature or temperature range. FIG. 1 shows that the energy optimization system 100 is a computer or electronic data processing system that may comprise a database 102, a goods temperature modeling engine 104, an air temperature modeling engine 106, and a thermal profile engine 108. The engines 104, 106, and 108 may be computer programs, applications, chips, hardware, firmware, and/or software that process information, data, and the like via one or more algorithms, programs, and/or equations. The system may also comprise a cold storage zone 120, which may be contained within a cold storage structure. The cold storage zone 120 is configured to receive a cold storage load of perishable goods 122. The cold storage zone 120 has an air that surrounds the goods 122 and may have one or more temperature sensors 124, which may transmit 129 continuous temperature readings 130 to the system 100. The continuous air temperature readings 130 may be verified and stored in database 133. The cold storage load of perishable goods may have a thermal profile that is provided to or determined by the thermal profile engine 108. The thermal profile of the load may be provided to or determined by, the thermal profile engine 108. The thermal profile engine 108, when provided with details about the load of perishable goods 122, may accurately model the thermal mass of the and/or the thermal inertia of the load of perishable goods to within a desired temperature range. In a preferred embodiment, the profile engine 108 may accurately model the thermal mass of the and/or the thermal inertia of the load to within 1° Celsius (C). The thermal profile may also comprise the minimum and maximum temperature at which the load of perishable goods must be maintained in order to prevent thermal abuse. Determining the thermal profile (and thermal mass and/or thermal inertia) of the load may take into consideration what is being stored (which may be any product (such as, by way of non-limiting example, lettuce, eggs, vaccines, frozen crab, cheese, and bags of ice, flowers, medicine, and the like)), the density of the goods, the mass of the goods, the weight of the goods, any packaging or insulation associated with the goods, whether there are more than one type of goods in the load, heterogeneity, homogeneity, the dimensions (height, length/width, and depth) of the load, the specific configuration of how the load is placed in the cold storage zone (layered, stacked, multiple individual units placed apart from the other units, etc.).

In addition to determining or receiving the thermal profile of the load, the system 100 may also take into consideration, determine, and/or receive, additional cold storage zone metadata 140, such as, the route to be traveled, the structural thermal mass of the cold storage structure, insulative factors of the cold storage structure, what cold storage structure is being used and that structure's temperature history, the temperature of the ambient air surrounding the cold storage structure, and/or what happens next to the load after the absolute or relative time durations.

Once the perishable goods 122 are loaded into the cold storage zone 120 the temperature of the goods is taken 150. This temperature data may be validated and stored 152 in the system database 102, which also stores the thermal profile of the load of perishable goods 122, and the metadata 140. The air temperature modeling engine may generate an air temperature forecast for the cold storage zone 120, based on the continuous air temperature readings 130, the historical data related to the particular cold storage zone 120, and a specific "set point" that controls or will control the HVAC 124 unit of the cold storage zone 120. One, more, or, preferable, all, of the data in the system database 102 and the air temperature forecast data may be transmitted to, or accessed by, the system temperature modeling engine 104. The system temperature modeling engine 104 models or simulates, over time (typically an absolute or relative time duration) the expected temperature of the load of cold storage perishable goods 122 and the current or expected thermal inertia of that load of goods 122. The system may then evaluate the simulated product temperature forecast against the remainder of a duration (absolute or relative) to determine whether the perishable goods 122 in the cold storage zone 120 will remain within a set temperature range 160 (the spec or specification), which is also referred to as the minimum and maximum temperature, which is part of the thermal profile. If the forecast of the temperature of the goods, which may be both an expected specific temperature and a temperature range, with an upper limit and lower limit, does not violate the specification, the simulation adjusts the set point 170 (usually to make the set point warmer). This adjusted set point is received by the air temperature modeling engine 106, which generates an air temperature simulation data, which is received by the product system temperature modeling engine 104. The system temperature modeling engine 104 simulates, again, the expected temperature of the load of cold storage perishable goods 122. If the specification is again not violated, the system 100 again adjusts the set point. This adjustment is done until the specification is violated, at which time, the immediate prior non-violating set point is selected 180. In an automatic controller system, the selected set point is relayed 181 to the HVAC 124 controller. In a manual system, the system 100 recommends to the user to manually adjust 182 the HVAC 124 with the selected set point. This recommendation 182 may be made by email, text, application program interface, webpage, and the like.

The cold storage zone 120 is typically a refrigerated transportation vessel, such as a cold storage truck or train car, but it may be an immobile freezer or refrigerator.

Figure 2:
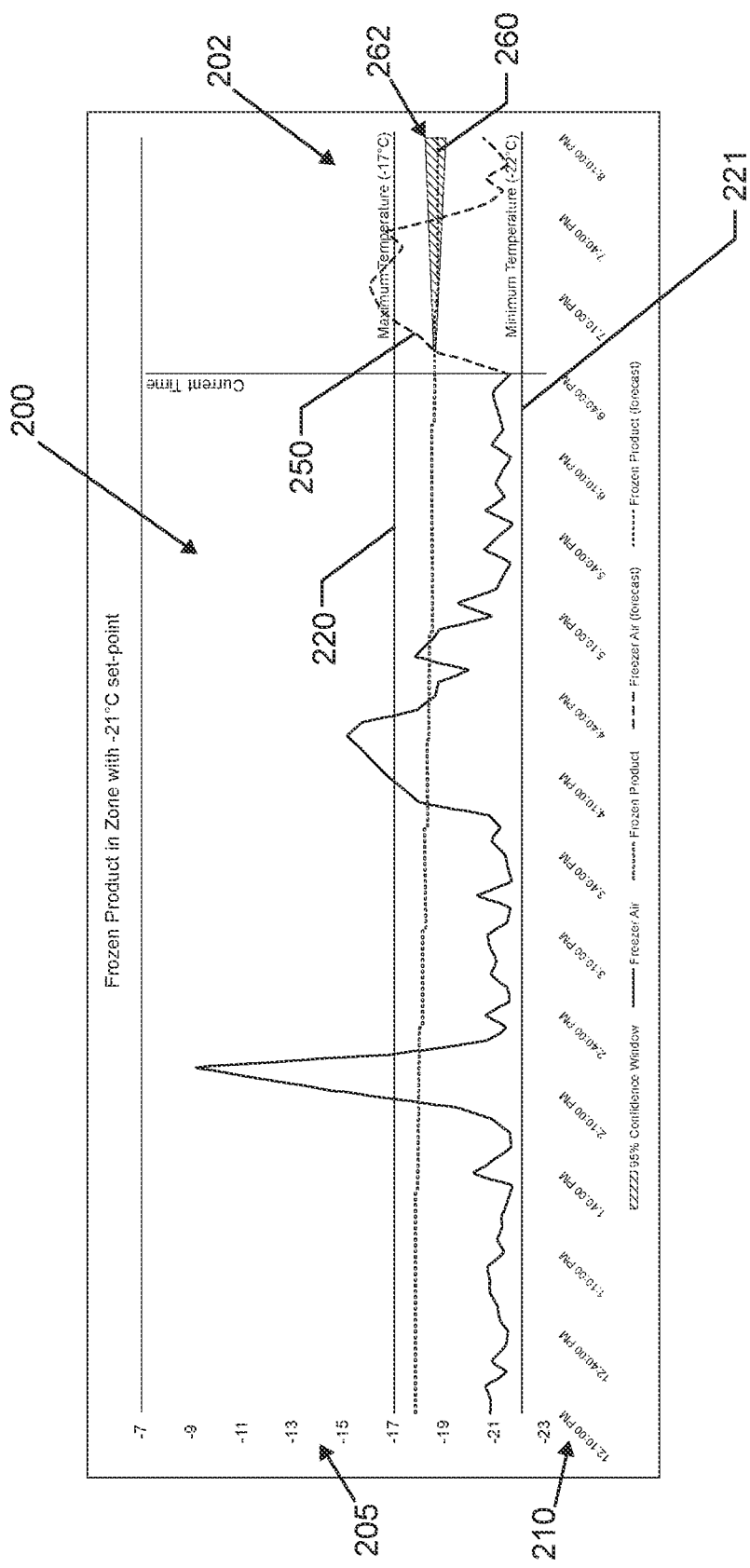
FIG. 2 is a forecast model graph of a cold storage zone with a set point between 0° and −21° C.

FIG. 2 is a forecast model graph of a cold storage zone with a set point of −21° C. FIG. 2 shows a graph 200 of a frozen product in a zone with a set-point of −21° C. The graph 200 is temperature 205 over time 210. The graph 200 shows the future, prediction, or simulation portion 202. The product being transported must be maintained within a −17° C. 220 to −22° C. 221 temperature range through 8:10 PM, which is the absolute duration time when it will be discharged from the cold storage zone. The current time is 6:40 PM, so the duration of predictive modeling 202 is 1.5 hours. The air temperature model engine 106 combines the thermal profile, the −21° C. set point, the past air temperatures, and the meta data to determine an air temperature forecast 250. The system uses the air temperature forecast 250, the recorded temperature of the load of perishable goods (which is preferably taken at the "Current Time", for best accuracy), the thermal profile, and the continuous cold storage zone air temperature monitoring, to model, or simulate, over time, the expected temperature of the load of cold storage perishable goods 260, which may be have a confidence window range 262. When evaluated, FIG. 2 shows that the product will remain well within specifications for the duration at the given set-point. The shaded area 262 represents a 95% confidence window, which may identify the upper and lower bound (range or window) within which 95% of observed values will be within based on the statistical model.

FIG. 2 shows that maintaining the HVAC of the cold storage zone at the given −21° C. set-point keeps the product well below the maximum temperature and such cooling is unnecessary and wastes energy. Thus, it is preferred that a warmer set point be modeled to see if the set point may be raised in order to make the cold storage system more energy efficient.

Figure 3:
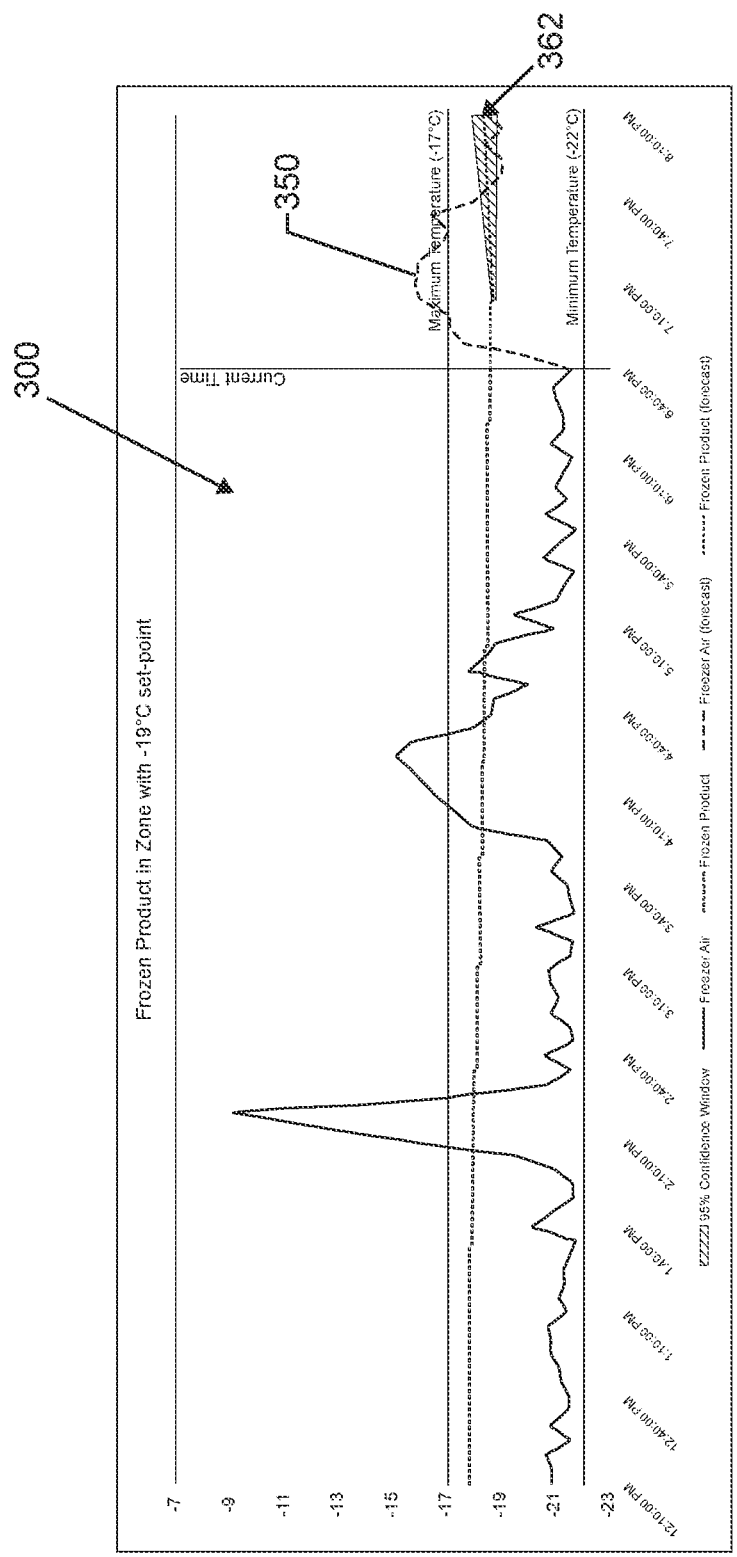
FIG. 3 is a forecast model graph of a cold storage zone with an adjusted set point of −19° C.

FIG. 3 is a forecast model graph of a cold storage zone with an adjusted set point of −19° C. The graph 300 in FIG. 3 shows that when the adjusted set point of −19° C. is modeled, the forecast air temperature 350 has risen slightly and consequently the product temperature 362 has risen slightly as well. However, the forecasted product temperature 362 is still within specification. As such a −19° C. set-point is a candidate for a recommended set point, and when compared with the −21° C. set point, it is a much more efficient set point. Typically, the system would then automatically select the next warmer or cooler set point the HVAC system allows, and then determine if the forecasted product temperature is still within specification.

Figure 4:
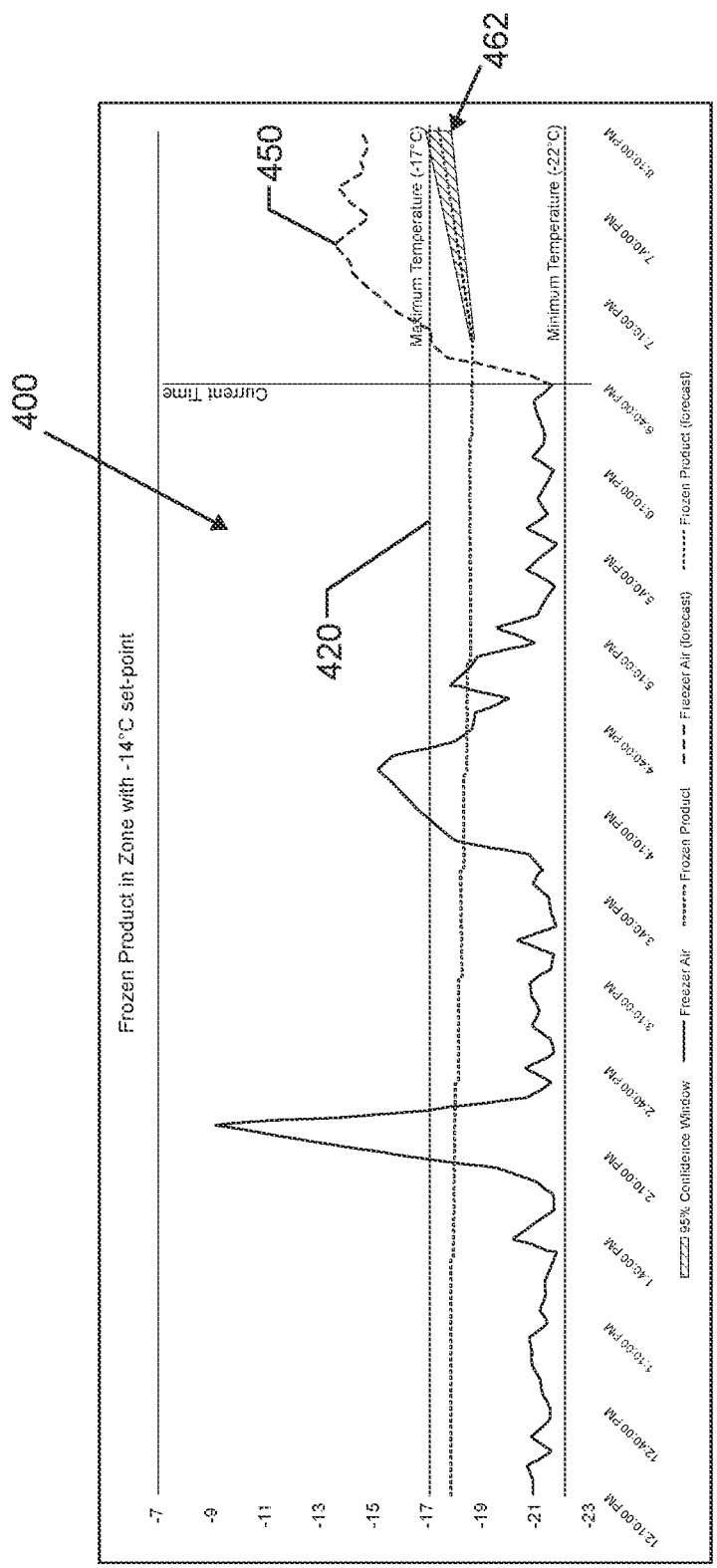
FIG. 4 is a forecast model graph of a cold storage zone with an adjusted set point of −14° C.

FIG. 4 is a forecast model graph of a cold storage zone with an adjusted set point of −14° C. The graph 400 shows that after the air temperature forecast 450 is determined, the product temperature 462 is forecasted. As shown, the 95% confidence window exceeds the specification by crossing the maximum temperature line 420. Accordingly, −14° C. may be discarded as a potential set point. To the extent that −15° C. was modeled and was within the specification, the system may recommend to the user to manually set −15° C. as the energy efficient set point, or the system may automatically communicate with the HVAC controller and adjust the set point to −15° C. for the duration of the travel time or until another set point is recommended using the method disclosed herein.

Figure 5:
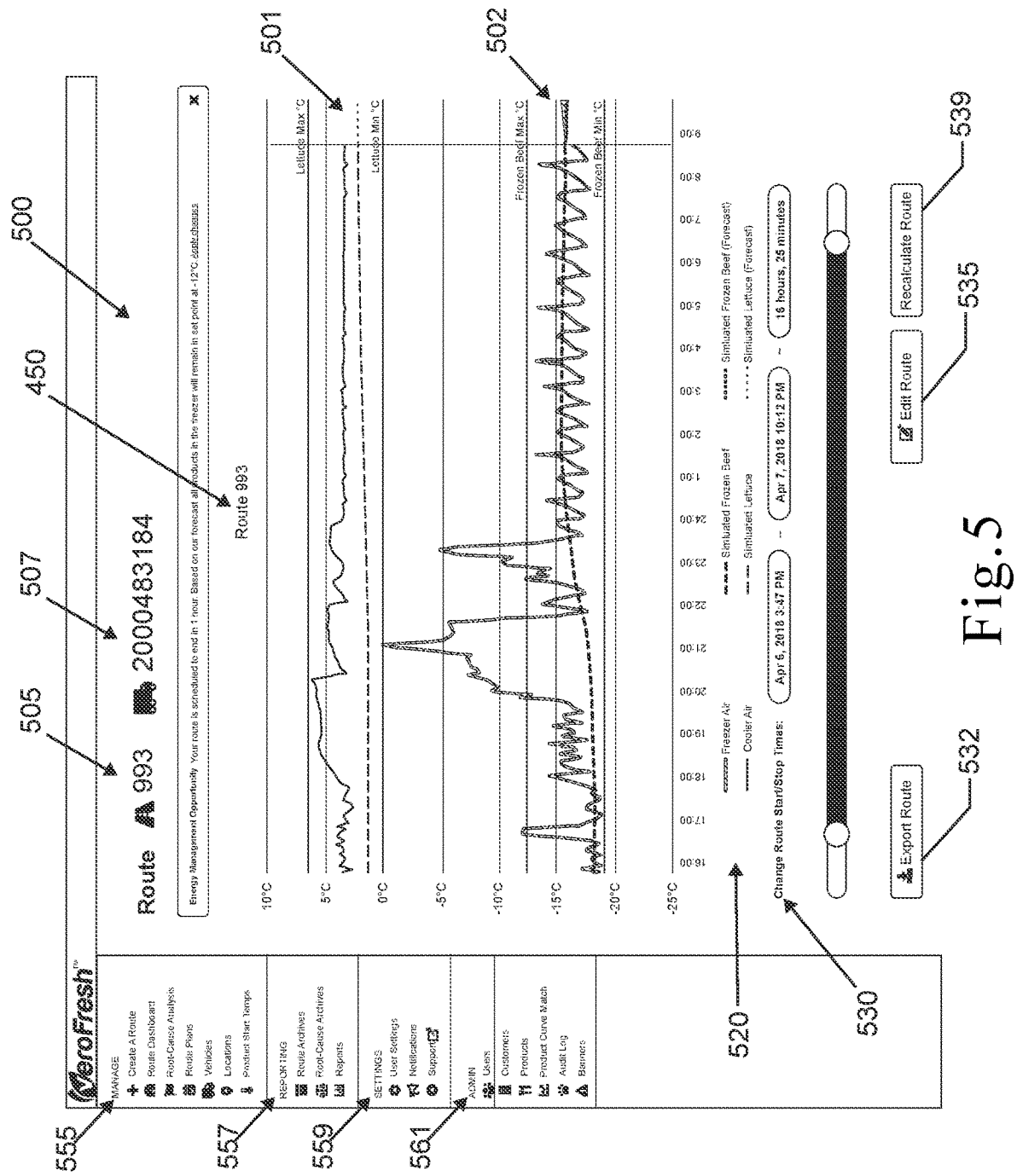
FIG. 5 is an illustration of a graphical user interface of a website providing the user with a recommendation of an optimal set point.

FIG. 5 is an illustration of a graphical user interface of a website providing the user with a recommendation of an optimal set point. FIG. 5 shows one embodiment of a mobile or web application graphical user interface (GUI) 500, which may be part of an energy optimization software system that allows the user to input data, review and change the system configurations, and receive a recommendations related to a set point adjustment that will optimize the energy efficiency of the absolute or relative time duration remaining in the cold storage transit of a load of goods. FIG. 5 shows that the GUI 500 may display to the user one or more set point simulations 501, 502. The load of goods being transported may be identified based on what route 505 and transportation vehicle identification 507 are associated with the load of goods. The graph displayed is providing a recommendation about a specific set point model. The graph may have a legend 520 and start and stop times 530. The system may allow a user to recalculate the route 539, edit the route 535, and export the route 532. The GUI 500 may have a trademark identifier 550, and a series of controls/links, including but not limited to: load manage functions 555 (which may include create a route, route dashboard, root-cause analysis, route plans, vehicles, locations, product start temperatures); reporting functions 557 (which may include a route archive, a root cause archive, and reports); settings functions 559 (which may include user settings, notifications, and support); and administrative functions 561 (which may include users, customers, products (or goods), product curve match, audit long, and banners). Preferably, the GUI 500 allows the user to access and control the system of the present disclosure. The goods are sometimes referred to as products.

Preferably, the system of the present disclosure allows the cold storage logistics chain to have a significant effect on the energy optimization. In one conservative analysis of this method applied to transportation of perishable goods on trailers, showed a reduction in HVAC use of 113 minutes per route. In one case, the HVAC was diesel driven and typically, each hour of time saved represents one gallon of diesel fuel saved. Because there are thousands and thousands of routes and loads, the energy and cost savings as a result of the system of the present disclosure are not trivial. There is also a positive environmental impact through the reduction of fuel consumption. Other indirect savings include reduced maintenance costs, due to the fact that the HVAC system runs for less time.

In one embodiment, rather than simulate the product temperature after only a single reading, the system is just as accurate if the product temperature is actually and continuously taken during transit.

The method described herein generally presents a scenario in which there is advanced knowledge of the planned end time through which the product(s) are to be kept within a temperature range. However, this process could also be applied in scenarios where the delivery or end time is unknown by forecasting out to a given duration (for example, 4 hours) and adjusting set-point temperatures. In this manner, the optimal product temperature may be maintained indefinitely.

The specific thermal inertia and thermal profile equation used is flexible. In addition to the factors described above, other profile and inertia algorithms may take into consideration: pressure, gas load, moisture saturation, humidity, wind, air flow, and the like. These additional considerations, may be observed, measured over time, made part of the forecast, and then taken into consideration when modeling the product temperature for a given set-point.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures may be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the figures may be performed by processing logic that comprises hardware (e.g. circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

While the present disclosure has been described in terms of particular variations and illustrative figures, those of ordinary skill in the art will recognize that the disclosure is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A product quality and energy optimization system for a load of perishable goods in temperature controlled storage, comprising:
    a temperature controlled storage zone within a temperature controlled storage structure, which receives a load of perishable goods;
    an air temperature sensor that takes a plurality of periodic air temperature measurements within said temperature controlled storage zone;
    a product temperature input that receives at least one product temperature measurement;
    one or more networked computers, comprising one or more databases, a goods temperature modeling engine, and an air temperature modeling engine;
    wherein said temperature controlled storage structure comprises a heating ventilation and air condition (HVAC) unit that provides temperature control to said temperature controlled storage zone;
    wherein said one or more networked computers receive said plurality of periodic air temperature measurements and said at least one product temperature measurement;
    wherein said one or more networked computers is configured to determine a thermal profile for said load of perishable goods;
    wherein said air temperature modeling engine produces one or more temperature controlled storage air temperature forecasts at a first set point of said temperature controlled storage zone;
    wherein said goods temperature modeling engine produces one or more goods temperature forecasts of said load of perishable goods using (1) at least one of said one or more temperature controlled storage air temperature forecasts, (2) at least one of said at least one product temperature measurement, and (3) said thermal profile; and
    wherein said one or more networked computers is configured to evaluate said one or more goods temperature forecasts of said load of perishable goods to determine whether said load of perishable goods will remain within a set temperature range.

2. The system of claim 1, wherein the system stores a load of perishable goods in a cold storage, wherein the system comprises a cold storage zone within a cold storage structure.

3. The system of claim 1, wherein if said load of perishable goods remains within said set temperature range, said first set point is replaced with at least a second set point and said air temperature modeling engine and said goods temperature modeling engine each produce at least a second forecast based on said at least second set point.

4. The system of claim 3, wherein if said load of perishable goods does not remain within said set temperature range after any specific forecast that set point is determined to be unacceptable.

5. The system of claim 4, wherein said second set point is a higher temperature than said first set point, such that if said at least second set point is used said HVAC unit is more energy efficient than if said first set point is used.

6. The system of claims 5, wherein a plurality of set points are modeled by said air temperature modeling engine and said goods temperature modeling engine until an optimal energy efficient set point is determined.

7. The system of claim 6, wherein after said optimal energy efficient set point is determined, the one or more networked computers inform a user to enter said optimal energy efficient set point into a controller of said HVAC unit.

8. The system of claim 6, wherein after said optimal energy efficient set point is determined, the one or more networked computers automatically update a controller of said HVAC unit with said optimal energy efficient set point.

9. The system of claim 6, wherein said one or more networked computers further comprise a thermal profile engine, which develops said thermal profile, wherein said thermal profile is developed based on one or more of the following: a thermal mass of said load of perishable goods; a thermal inertia of said load of perishable goods; a weight of said load of perishable goods; and a specific configuration of said load of perishable goods within said temperature controlled storage zone.

10. The system of claim 9, wherein said one or more temperature controlled storage air temperature forecasts are determined by analyzing said a plurality of the periodic air temperature measurements, a plurality of past air temperature measurements, and one or more sets of meta data.

11. The system of claim 10, wherein said one or more sets of meta data is selected from the group of meta data consisting of one or more of the following: a thermal mass data associated with said temperature controlled storage structure; route data associated with a transportation route of the load of perishable goods; a temperature history of said temperature controlled storage structure; and one or more temperature measurements of an ambient air that surrounds the temperature controlled storage structure.

12. The system of claim 11, wherein said thermal profile comprises said set temperature range, which is a minimum temperature and a maximum temperature at which said load of perishable goods must be maintained in order to prevent thermal abuse of said perishable goods.

13. The system of claim 1, wherein said one or more networked computers further comprise a thermal profile engine, wherein said thermal profile is developed by said thermal profile engine, wherein said thermal profile is developed based on one or more of the following: a thermal mass of said load of perishable goods; a thermal inertia of said load of perishable goods; a weight of said load of perishable goods; and a specific configuration of said load of perishable goods within said temperature controlled storage zone.

14. The system of claim 4, wherein said one or more temperature controlled storage air temperature forecasts are determined by analyzing said a plurality of the periodic air temperature measurements, a plurality of past air temperature measurements, and one or more sets of meta data.

15. The system of claim 5, wherein said one or more sets of meta data is selected from the group of meta data consisting of one or more of the following: a thermal mass data associated with said temperature controlled storage structure; route data associated with a transportation route of the load of perishable goods; a temperature history of said temperature controlled storage structure; and one or more temperature measurements of an ambient air that surrounds the temperature controlled storage structure.

16. The system of claim 6, wherein said thermal profile comprises said set temperature range, which is a minimum temperature and a maximum temperature at which said load of perishable goods must be maintained in order to prevent thermal abuse of said perishable goods.

17. The system of claim 1, wherein if said forecast of load of perishable goods is not within said set temperature range, said first set point is replaced with at least a second set point and said air temperature modeling engine and said goods temperature modeling engine each produce a least a second forecast based on said at least second set point until a set point is reached that forecasts the perishable goods to be within said set temperature range.

18. The system of claim 17, wherein if said load of perishable goods comes to within said set temperature range that set point is determined to be the optimal energy efficient set point.

19. The system of claim 18, wherein after said optimal energy efficient set point is determined, the one or more networked computers inform a user to enter said optimal energy efficient set point into a controller of said HVAC unit.

20. A product quality and energy optimization system for a load of perishable goods in cold storage, comprising:
a cold storage zone within a cold storage structure, which receives a load of perishable goods;
an air temperature sensor that takes a plurality of periodic air temperature measurements within said cold storage zone;
a product temperature input that receives at least one product temperature measurement;
one or more networked computers, comprising one or more databases, a goods temperature modeling engine, and an air temperature modeling engine;
wherein said cold storage structure comprises a heating ventilation and air condition (HVAC) unit that provides cooling to said cold storage zone;
wherein said one or more networked computers receive said plurality of periodic air temperature measurements and said at least one product temperature measurement;
wherein said one or more networked computers is configured to determine a thermal profile for said load of perishable goods;
wherein said air temperature modeling engine produces one or more cold storage air temperature forecasts at a first set point of said cold storage zone;
wherein said goods temperature modeling engine produces one or more goods temperature forecasts of said load of perishable goods using (1) at least one of said one or more cold storage air temperature forecasts, (2) at least one of said at least one product temperature measurement, and (3) said thermal profile;
wherein said one or more networked computers is configured to evaluate said one or more goods temperature forecasts of said load of perishable goods to determine whether said load of perishable goods will remain within a set temperature range.

\* \* \* \* \*